(12) United States Patent
Thakur et al.

(10) Patent No.: US 11,921,738 B2
(45) Date of Patent: Mar. 5, 2024

(54) DOCUMENT SYNCHRONIZATION SYSTEM AND METHOD THAT BYPASSES REDUNDANT TRANSACTIONS

(71) Applicant: Microsoft Technology Licensing, LLC, Redmond, WA (US)

(72) Inventors: Shivani Thakur, Cupertino, CA (US); Guoqiang Zhou, Bellevue, WA (US); Ana Monica Irimia, Adliswil (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/829,823

(22) Filed: Jun. 1, 2022

(65) Prior Publication Data

US 2023/0394056 A1 Dec. 7, 2023

(51) Int. Cl.
| | |
|---|---|
| *G06F 16/20* | (2019.01) |
| *G06F 16/23* | (2019.01) |
| *G06F 16/25* | (2019.01) |
| *G06F 16/27* | (2019.01) |
| *G06F 16/93* | (2019.01) |

(52) U.S. Cl.
CPC ........ *G06F 16/254* (2019.01); *G06F 16/2308* (2019.01); *G06F 16/27* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 2007/0136305 A1 | 6/2007 | Kelley et al. | |
| 2009/0271447 A1* | 10/2009 | Shin | G06F 16/182 |
| 2010/0023605 A1* | 1/2010 | Li | G06F 15/177 |
| | | | 709/221 |
| 2021/0034571 A1* | 2/2021 | Bedadala | G06F 16/2379 |

OTHER PUBLICATIONS

"International Search Report and Written Opinion issued in PCT Application No. PCT/US23/018441", dated Aug. 4, 2023, 14 Pages.

* cited by examiner

*Primary Examiner* — Jau Shya Meng
(74) *Attorney, Agent, or Firm* — Novo TechIP International PLLC

(57) ABSTRACT

Methods for synchronizing a source document repository with a target document repository include monitoring documents of the source document repository to detect changes to the documents. A last processed time is stored in association each changed document that indicates a time when the document was last processed. A transaction item is added to a synchronization queue each time a document is changed, and a queue time is stored in association with each of the transaction items that indicates when the transaction item was added to the queue. The transaction items are processed by comparing the queue time of the transaction item with the last processed time of the document pertaining to the transaction item. If the queue time is earlier than the last processed time, the transaction item is ignored.

20 Claims, 7 Drawing Sheets

MetaData Table

| Document ID | Storage Location | Last Processed Time |
|---|---|---|
| doc1 | loc1 | t4 |
| doc2 | loc2 | t2 |
| doc3 | loc3 | t3 |

FIG. 3

Synchronization Queue

| Transaction ID | Document ID | Queue Time |
|---|---|---|
| item1 | doc1 | t1 |
| item2 | doc2 | t2 |
| item3 | doc3 | t3 |
| item4 | doc1 | t4 |

DOCUMENT SYNCHRONIZATION SYSTEM AND METHOD THAT BYPASSES REDUNDANT TRANSACTIONS

BACKGROUND

A document management system (DMS) is a computer program or set of programs for managing a repository of documents containing a wide variety of data, usually on behalf of multiple users. The documents may include text files, spreadsheet files, web pages, tables, graphics, images, video, audio, and the like. The documents are typically stored in a database, file system, flat file, or other suitable structure that enables a DMS to manage and organize the documents. A DMS may allow users to create, modify, copy, delete and/or perform other operations with respect to the documents in the repository. A DMS typically uses metadata to index, search, retrieve and control access to documents in the repository. Metadata may be stored in a database, such as a relational database, which enables the metadata to be queried using a database language, such as structured query language (SQL).

For various reasons, some organizations or enterprises may require that a DMS be replicated. Replication typically involves copying all or a portion of the documents and relevant metadata from a source repository to a target repository. The documents and metadata are then continuously updated in the target repository to reflect changes made in the source repository. To maintain a target repository synchronized with a source repository, the documents in the source repository are monitored to detect changes which may result from editing, updating, creating and deleting a document. Each time any one of the documents in the source repository is changed, a transaction is added to a synchronization queue. The transactions are processed sequentially by accessing the document associated with each transaction and then synchronizing the document to the target repository.

One issue faced in synchronizing documents in this manner is duplicate or redundant transactions. Changes to a document can occur frequently. Due to synchronization latency, it is possible that the synchronization queue may contain multiple transactions pertaining to the same document. However, when the earliest transaction pertaining to the document is finally processed, the current version of the document is accessed and synchronized to the target repository. This means that all the changes to the document will be synchronized, including changes associated with later transactions that are currently in the queue. These later transactions will still be processed. However, these later transactions are considered redundant transactions since no new information will be synchronized to the target repository.

Hence, there is a need for a system and method for synchronizing documents from a source repository to a target database that reduces or eliminates the processing of redundant transactions.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 shows an example of a metadata table for the documents of the source repository of FIG. 2.

FIG. 4 shows an example of a synchronization queue of the synchronization system of FIG. 2.

SUMMARY

Figure 1:
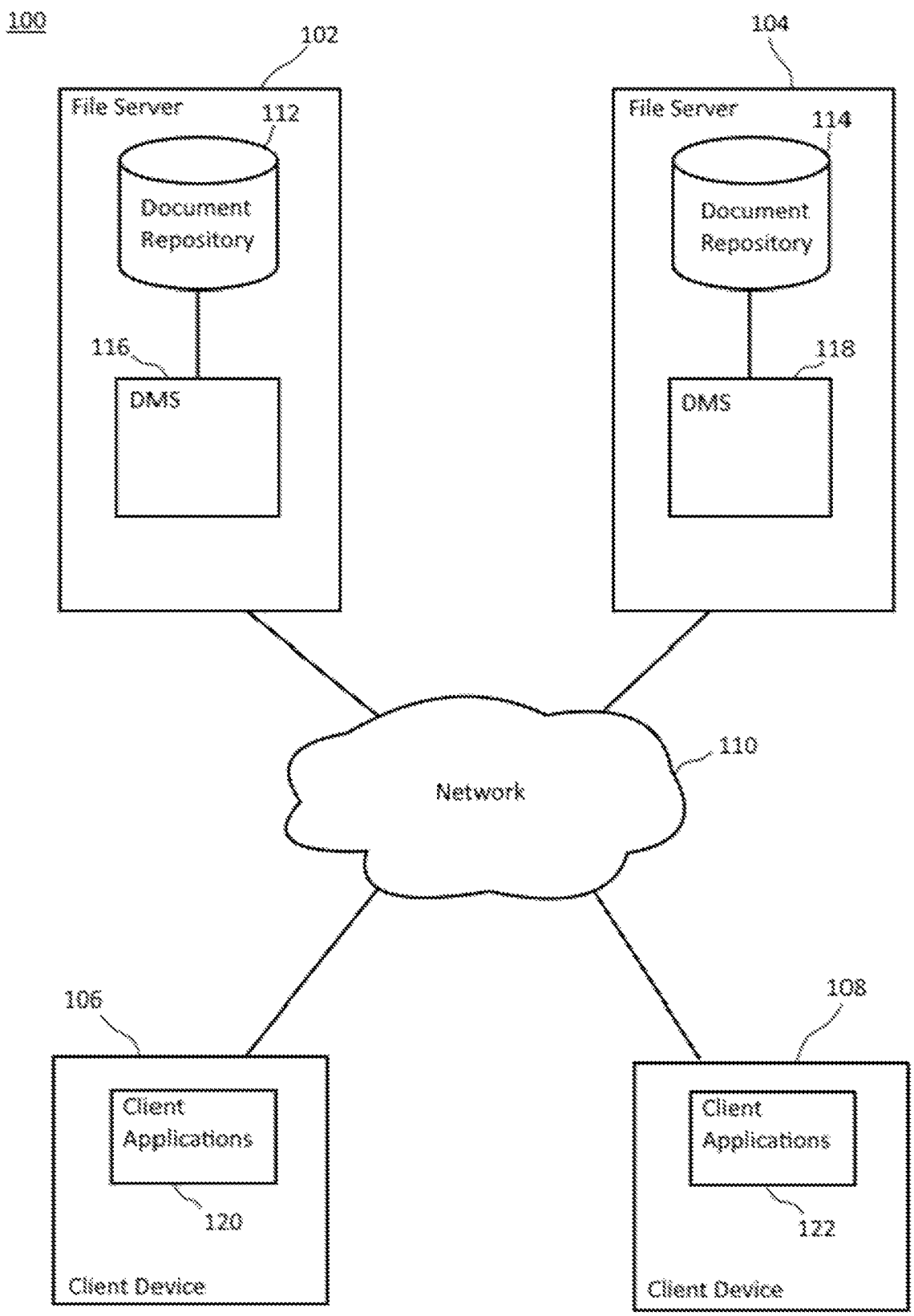
FIG. 1 shows an example system upon which aspects of this disclosure may be implemented.

In one general aspect, the instant disclosure presents a computing device that includes at least one processor and a memory in communication with the processor, the memory comprising executable instructions that, when executed by the processor, cause the data processing system to perform multiple functions. The functions include the steps of determining when documents in a source document repository have been changed; storing a last modification time in association each of the changed documents that indicates a time when each of the respective changed documents was last modified; adding a transaction item to a synchronization queue for each of the changed documents, each transaction item identifying a document that was changed; storing a queue time in association with each transaction item that indicates a time when the transaction item was added to the synchronization queue; performing a transaction processing method. The transaction processing method includes the steps of accessing a current transaction item in the synchronization queue to determine a queue time of the current transaction item and to identify the document pertaining to the current transaction item; determining the last modification time of the document pertaining to the current transaction item; comparing the queue time of the current transaction item with the last modification time of the document pertaining to the current transaction item to determine whether the queue time is earlier than the last modification time; if the queue time is not earlier than the last modification time, synchronizing the document pertaining to the current transaction item to a target document repository; and if the queue time is earlier than the last modification time, synchronizing the document pertaining to the current transaction item to a target document repository.

In yet another general aspect, the instant disclosure presents a method of synchronizing a source document repository with a target document repository. The method includes the steps of determining when documents in a source document repository have been changed; storing a last modification time in association each of the changed documents that indicates a time when each of the respective changed documents was last modified; adding a transaction item to a synchronization queue for each of the changed documents, each transaction item identifying a document that was changed; storing a queue time in association with each transaction item that indicates a time when the transaction item was added to the synchronization queue; performing a transaction processing method on the transaction items in the synchronization queue. The transaction processing method includes the steps of accessing a current transaction item in the synchronization queue to determine a queue time of the current transaction item and to identify the document pertaining to the current transaction item; determining the last modification time of the document pertaining to the current transaction item; comparing the queue time of the current transaction item with the last modification time of the document pertaining to the current transaction item to determine whether the queue time is earlier than the last modification time; if the queue time is not earlier than the last modification time, synchronizing the document pertaining to the current transaction item to a target document repository; and if the queue time is earlier than the last modification time, synchronizing the document pertaining to the current transaction item to a target document repository.

In a further general aspect, the instant application describes a non-transitory computer readable medium on which are stored instructions that, when executed, cause a programmable device to perform multiple functions. The functions include the steps of determining when documents in a source document repository have been changed; storing a last modification time in association each of the changed documents that indicates a time when each of the respective changed documents was last modified; adding a transaction item to a synchronization queue for each of the changed documents, each transaction item identifying a document that was changed; storing a queue time in association with each transaction item that indicates a time when the transaction item was added to the synchronization queue; performing a transaction processing method. The transaction processing method includes the steps of accessing a current transaction item in the synchronization queue to determine a queue time of the current transaction item and to identify the document pertaining to the current transaction item; determining the last modification time of the document pertaining to the current transaction item; comparing the queue time of the current transaction item with the last modification time of the document pertaining to the current transaction item to determine whether the queue time is not earlier than the last modification time, synchronizing the document pertaining to the current transaction item to a target document repository; and if the queue time is earlier than the last modification time, synchronizing the document pertaining to the current transaction item to a target document repository.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

For various reasons, some organizations, enterprises, and/ or applications may require that a DMS be replicated. Replication typically involves copying all or a portion of the documents and relevant metadata from a source repository to a target repository. The documents and metadata are continuously updated in the target repository to reflect changes made in the source repository. Replication may be used to create a backup of a document repository that may be used to restore or replace a document repository in the event of a catastrophic failure. In some cases, a document repository may be replicated to provide one version of a document repository that allows users to create, modify, update, and delete documents and another version of the document repository that provides read-only access for querying and reporting purposes only.

To maintain a target repository synchronized with a source repository, the documents in the source repository are monitored to detect changes which may result from editing, updating, creating and deleting documents. Each time any one of the documents in the source repository is changed, a transaction is added to a synchronization queue. Each transaction in the queue includes information identifying the document that was changed. The transactions are processed sequentially by accessing the document associated with each transaction and then synchronizing the document to the target repository.

One issue faced in synchronizing documents in this manner is duplicate or redundant transactions. Changes to a document can occur frequently. Due to synchronization latency, it is possible that the synchronization queue may contain multiple transactions pertaining to the same document. However, when the earliest transaction pertaining to the document is finally processed, the current version of the document is accessed and synchronized to the target repository. This means that all of the changes to the document will be synchronized, including changes associated with later transactions pertaining to the same document that are currently in the queue. These later transactions will still be processed. However, these later transactions are considered redundant transactions since no new information will be synchronized to the target repository.

To address these technical problems and more, in an example, this description provides technical solutions that prevent the processing of duplicate or redundant transactions when synchronizing documents from a source repository to a target repository. The solutions involve the use of time-based identifiers. Each time a document is processed and synchronized to the target repository, a time-based identifier in the form of a last processed time identifier is stored in association with the modified document that indicates the time the document was last processed using the synchronization system. The last processed time identifier for a document may be added to the metadata of the document. For example, a column may be added to a database table having the metadata for the documents to provide a place for storing the last processed time identifier for each document. As another example, the last processed time identifier for a document may be stored in the document itself along with the other metadata for the document.

In addition, each time a transaction is added to the synchronization queue, a time-based identifier in the form of a queue time identifier is stored in association with the transaction that indicates the time that the transaction was added to the synchronization queue. The queue time identifier may be added as a field to the transaction record when the transaction is added to the queue. Alternatively, a separate data structure, such as a table, may be used to store the queue time identifier for each transaction in the queue. When a transaction is being processed, the queue time identifier for the transaction is compared with the last processed time identifier for the document pertaining to the transaction. If the queue time of the transaction is earlier than the last processed time of the document, the transaction is ignored. If the queue time of the transaction is not earlier than the last processed time of the document, the document is synchronized to the target repository.

As will be understood by persons of skill in the art upon reading this disclosure, benefits and advantages provided by such implementations can include, but are not limited to, a technical solution to the technical problems associated with synchronizing a source document repository with a target document repository that prevents the processing of redundant transactions are which can reduce the latency of the synchronization system and also free up system resources to perform other useful work.

FIG. 1 illustrates an example system 100, upon which aspects of this disclosure may be implemented. The system 100 includes file servers 102, 104, client devices, 106, 108 and a network 110. File servers 102, 104 may each include one or more servers which may be any type of computing device described herein or otherwise known. Each file server includes or has access to a respective document repository 112, 114. Each file server 102, 104 is configured to implement a document management system (DMS) 116, 118 for organizing and maintaining documents in the respective document repositories 112, 114. Each DMS 116, 118 is configured to enable client devices, such as client devices 106, 108, to access the documents stored in the respective document repository 116, 118. The client devices 106, 108 may be any type of computing device, such as a desktop computer, laptop computer, mobile phone, tablet, or other type of computing device. Client devices 106, 108 may include client applications 120, 122 for communicating with DMSs 116, 118 and accessing the documents stored in the document repositories 112, 114. Client devices 106, 108 and file servers 102, 104 are communicatively coupled by network 110. Network 110 may include one or more wired/wireless communication links and/or communication networks, such as a PAN (personal area network), a LAN (local area network), a WAN (wide area network), or a combination of networks, such as the Internet.

For various reasons, organizations, enterprises, and/or applications may require that all or a portion of a document repository be replicated from a source repository to a target repository. For example, document repository 112 of file server 102 may be designated a source repository that is to be replicated in a target repository, such as the document repository 114 of file server 104. In embodiments, the source repository 112 may be used for creating, deleting, and modifying documents while the target repository 114 may be configured to provide read-only access for querying and reporting purposes only. In other embodiments, target repository 114 may be configured to serve as a backup that may be used to restore or replace the source repository 112 in the event of a failure.

Figure 2:
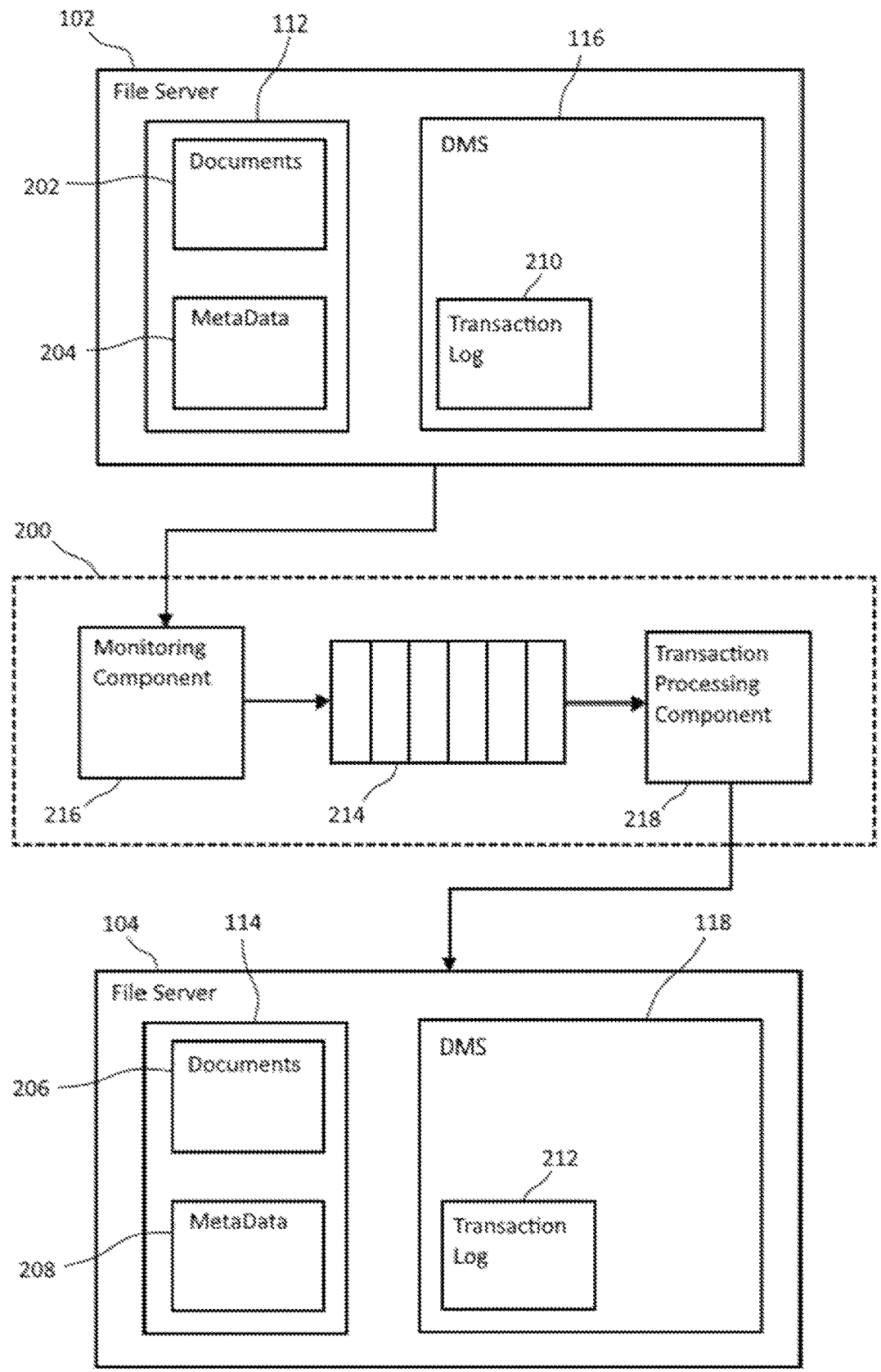
FIG. 2 shows an example of a synchronization system for synchronizing documents from the source document repository to the target document repository of FIG. 1.

FIG. 2 shows an example of a synchronization system 200 for replicating a source document repository, such as repository 112, in a target document repository, such as repository 114. As shown in FIG. 2, file server 102 includes DMS 116 for organizing, maintaining and controlling access to documents 202 in the source document repository 112. File server 104 includes DMS 118 for organizing, maintaining and controlling access to documents 206 in the target document repository 114. A "document repository" as used herein is a collection of documents organized in memory or on a non-volatile storage volume. Documents 202, 206 may contain data of different types and/or adhere to different file formats. Examples of documents include text files, spreadsheets, structured tables, graphics files, digital images, video, audio, and the like which may be provided in different formats and file types. In embodiments, the documents 202, 206 are stored in a database which supports or is optimized for data retrieval using a database query language, such as Structured Query Language (SQL). In other embodiments, the documents 202, 206 may be stored in a file system, flat file, or other suitable structure. Document repositories 112, 114 may reside on a single storage device or system or on multiple storage devices or systems which are on or accessible by the respective DMSs 116, 18.

DMS 116 may use metadata 204 to index, search, retrieve and control access to documents in the source repository 112, and DMS 118 may use metadata 208 to index, search, retrieve and control access to documents in the target repository 114. Metadata 204, 208 may include document metadata for characterizing and classifying the documents in the document repository. Examples of document metadata include storage location, data type, file type, file size, author, title, date, keywords, references to other files, and the like, which may be used by the DMS to index, search and retrieve documents in the repository. Metadata 204, 208 may also include user metadata pertaining to the users of the DMS. Examples of user metadata include name, address, job title, username, access permissions, and the like may be used by the DMS to control access to the documents. In embodiments, document metadata and user metadata may be stored in a database, such as a relational database, which enables the metadata to be queried using a database language, such as structured query language (SQL).

In embodiments, document metadata may be stored in a database table, referred to herein as a metadata table. An example of a metadata table 300 is shown in FIG. 3. In this example, the metadata table 300 includes the metadata for the source document repository 112. The metadata table 300 includes a plurality of rows 302, 304, 306 and a plurality of columns 308, 310, 312. Each row 302, 304, 306 corresponds to a different one of the documents in the source repository 112. In the example of FIG. 3, the metadata table 300 includes three rows 302, 304, 306 corresponding to three documents in the source repository 112. In implementations, a document repository would likely have a very large number of documents which would be reflected by a corresponding number of rows in the metadata table 300.

Each column 308, 310, 312 in the metadata table 300 corresponds to a different type of metadata information used to characterize the documents in the repository 112. The metadata table 300 includes a document identification (ID) column 308 and a storage location column 310. The document ID column 308 is used to store a unique identifier pertaining to each document, e.g., doc1, doc2, doc3 in this case, and the storage location column 310 is used to store location information, such as a location in a storage device, pertaining to each document, e.g., loc1, loc2, loc3 in this case. The metadata table 300 may include other columns for storing other information pertaining to each document. The metadata table 300 includes a modification time column 312 for storing a last modification time for each document (explained in more detail below).

To access a document (e.g., doc1, doc2, or doc3) in the source repository 112, the metadata table 300 may be queried to find the record pertaining to the document and identify the metadata information indicating the storage location (e.g., loc1, loc2, or loc3) of the document. The DMS 116 may then access the identified storage location to retrieve the document. In embodiments, documents and metadata may be stored in the same database. In other embodiments, documents and metadata may be stored in separate databases. In yet other embodiments, documents may be stored in a file system and metadata may be stored in a database. It is to be understood that the above discussion regarding the metadata table 300 for source document repository 112 is also applicable to a metadata table (not shown) for target document repository 114.

DMSs 116, 118 may each be configured to implement applications that enable users to connect to the DMSs 116, 118 and utilize the functionality of the systems, such as searching document content, searching documents, viewing documents and/or metadata, modifying documents and/or metadata, creating documents, deleting documents, and downloading documents. For example, DMSs 116, 118 may be configured to implement a web application that client devices, such as client devices 106, 108, can access via the network 110 using a client application 120, 122, such as a web browser. In embodiments, client applications 120, 122 may include local client applications that enable the user to interact with the DMSs 113, 118, For example, DMSs 116, 118 may include an Application Programming Interface (API) that defines standards for communicating with the DMS and implementing functionality of the system. The API may define functions for authenticating users, viewing documents, searching documents, creating new documents, modifying documents, downloading documents, and deleting documents.

Client applications 120, 122 may include user interfaces for communicating with the DMSs 116, 118 and implementing the functionality of the systems, e.g., search, retrieve, modify, download, create and delete, using the API. In embodiments, client applications 120, 122 may include a file-browser application, such as Windows® Explorer, that enables the documents to be presented to the user in a hierarchical file system structure. Client applications 120, 122 may also include applications that enable a user to create, modify and delete documents. Examples of such applications include text editors, word processors, spreadsheet applications, graphics editors, image capturing and editing applications, integrated development environments (IDEs), and the like. In embodiments, DMSs 116, 118 may include mechanisms for synchronizing documents between client devices 106, 108 and the respective document repositories 112, 114. Documents may be synchronized between client devices 106, 108 and document repositories 112, 114 in any suitable manner.

DMSs 116, 118 may each be configured to log transactions performed with the respective document repositories 112, 114, such as changes to documents and/or metadata. For example, DMS 116 may add a transaction to the transaction log 210 when a transaction occurs in source document repository 112, and DMS 118 may add a transaction to the transaction log 212 when a transaction occurs in the target document repository 114. The transaction logs 210, 212 may be used in the event of a failure of the respective systems so that changes may be rolled back to bring the systems to a previous state before the failure.

Synchronization system 200 includes a synchronization queue 214, a monitoring component 216, and a transaction processing component 218. The monitoring component 206 is configured to capture transactions indicating changes to the documents 202 in the source document repository 112. These changes may result from editing, updating, creating and deleting documents in the source document repository. The term "transaction" is used in this context to designate a unit of work comprising one or more changes made to a document by a single user or group of users that has been acknowledged and approved by the DMS 116. A transaction may occur when a document has been created and added to the repository, when a document has been deleted from the repository, and when a document has been modified or updated and the changes to the document have been incorporated into the document in the repository.

The monitoring component 216 may detect transactions in any suitable manner. In embodiments, the monitoring component 216 may be implemented as a function of the DMS 116. For example, the DMS 116 may be configured automatically to add a transaction item to the synchronization queue 214 each time an operation results in a change to a document in the document repository 112. As another example, the monitoring component 216 may be a separate component from the DMS 116 that is configured to monitor the transaction log 210 of the DMS 116 to detect transactions that result in one or more changes to a document and add transaction items to the synchronization queue 214. As yet another example, the monitoring component 216 may be implemented using a database trigger. Database triggers are pieces of software code that can be executed in response to a predetermined event that occurs within a database. For example, a triggering component used for change tracking may be constructed in such a way that a create, update, or delete operation performed by the DMS 116 causes the trigger code to execute and add a transaction item to the synchronization queue 214.

Synchronization queue 214 may be implemented as a data structure, such as a first-in-first-out (FIFO) queue, table, or other suitable data structure. Transaction items are added sequentially to the synchronization queue 214 in the order that the transactions are performed in the source document repository 112. Transaction items in the synchronization queue 214 are processed sequentially by the transaction processing component 218. Transaction processing component 218 is configured to access transaction items in the order they are added to the synchronization queue 214 and to synchronize the document associated with each transaction item to the target document repository 114. The documents may be synchronized to the target repository 114 in any suitable manner. For example, the documents may be synchronized by providing the document to the DMS 118 where it is used to overwrite the corresponding document in the target repository 114. Transaction processing component 218 may be configured to utilize the network 110 to communicate with the DMS of the target repository to synchronize the document.

An example of a synchronization queue 214 is shown in FIG. 4. Synchronization queue 214 includes transaction items 316, 318, 320, 322 which have been added to the synchronization queue 214 by the monitoring component 216. Only four transaction items are shown in the synchronization queue 214. In implementations, more or fewer transaction items may end up in the synchronization queue 214 at one time. The synchronization queue 214 may be stored in transient or non-transient storage media. In embodiments, the synchronization queue 214 may be stored in a non-transient storage medium so that if a failure of some sort should cause the synchronization system 200 to fail, transactions that have not yet been processed at the time of failure will still be available to process when synchronization is restored.

Each transaction item 316, 318, 320, 322 may be in the form of data structure having a transaction item identification (ID) field 310 for including information that uniquely designates the transaction item, e.g., item1, item2, item3, and item4 in this case. In embodiments, the transaction ID may be used to signify the order in which the transaction items are added to the synchronization queue 214. The transaction ID may take any form including numeric or alphanumeric characters that are capable of indicating a processing order for the transaction items. Transaction items 316, 318, 320, 322 may also include a document ID field 312 that includes information identifying the document pertaining to the transaction item, e.g., doc1, doc2, and doc3 in this case. Transaction items 316, 318, 320, 322 may include other fields for indicating other information pertaining to the transaction, such as a queue time identifier field 314 (explained in more detail below).

In the example of FIG. 4, synchronization queue 214 includes a first transaction item 316 that is designated item1 and indicates a change to document doc1, a second transaction item 318 that is designated item2 and indicates a change to document doc2, and a third transaction item 320 that is designated item3 and indicates a change to document doc3. The synchronization queue 214 also includes a fourth transaction item 322 that is designated item4 and indicates that document doc1 has been modified again before the first transaction 316 (item1) pertaining to document doc1 has been processed. In previously known systems, processing transaction item 316 would result in all of the changes to document doc1 from both transaction item 316 and transaction item 322 being synchronized to the target document repository 114. This would render transaction item 322 redundant since processing this transaction would not result in new information being synchronized to the target repository 114.

To prevent the processing of redundant transactions, the synchronization system 200 is configured to make use of time-based identifiers. The time based identifiers include last processed time identifiers and queue time identifiers. Each time a transaction on a document is processed using the synchronization system, a last processed time identifier is stored in association with the modified document that indicates the time the document was last synchronized. The last processed time identifier is then updated each time a transaction is processed to perform the synchronization of the document. In embodiments, the monitoring component 219 and/or the DMS 116 may be configured to determine and store the last processed time identifiers for the documents in the source repository 112.

In implementations, the processed time identifiers for the documents may be added to the metadata 204 for the documents 202. For example, the processed time identifiers may be included in the metadata table 300 for the source repository as seen in FIG. 3. To utilize time-based identifiers, a column 312 is included or added to the metadata table 300 for storing and maintaining the last processedtime identifiers for each document. In the example of FIG. 3, document doc/includes a last processed time identifier indicating that document doc1 was last processed at time t4. Document doc2 includes a last processedtime identifier indicating that document doc2 was last processed at time t2. Document doc3 includes a modification time identifier indicating that document doc3 was last processed at time t3. The time information may be entered into the metadata table 300 in any suitable format including numeric or alphanumeric characters, and may have any level of precision, e.g. seconds, tenths of a second, and hundredths of a second. As an alternative to storing last processed time identifiers in metadata table 300, a last processed time identifier for a document could be stored within the document itself along with other metadata pertaining to the document.

Each time a transaction item is added to the synchronization queue 214, a queue time identifier is stored in association with the transaction item that indicates the time that the transaction item was added to the synchronization queue 214. In embodiments, the monitoring component 216 and/or the DMS 116 may be configured to store queue time identifiers in association with the transaction items in the synchronization queue 214. For example, a field 314 may be added to the transaction items in the synchronization queue 214 as shown in FIG. 4. Each time a transaction item, such as transaction items 316, 318, 320, 322, is added to the synchronization queue 214 the time that the transaction item was added to the queue is entered into the queue time field 314. In the example of FIG. 4, transaction item 316 includes a queue time identifier indicating that the first transaction item 316 was added to the queue 214 at time t1. Transaction item 318 includes a queue time identifier indicating that transaction item 318 was added to the queue 214 at time 12. Transaction item 320 includes a queue time identifier indicating that transaction item 320 was added to the queue 214 at time t3. Transaction item 322 includes a queue time identifier indicating that transaction item 322 was added to the queue 214 at time t4. As an alternative to storing the queue time identifiers for the transaction items in the synchronization queue 214, a separate data structure, such as a table, may be used to store the queue time identifiers in association with transaction items in the synchronization queue.

Figure 5:
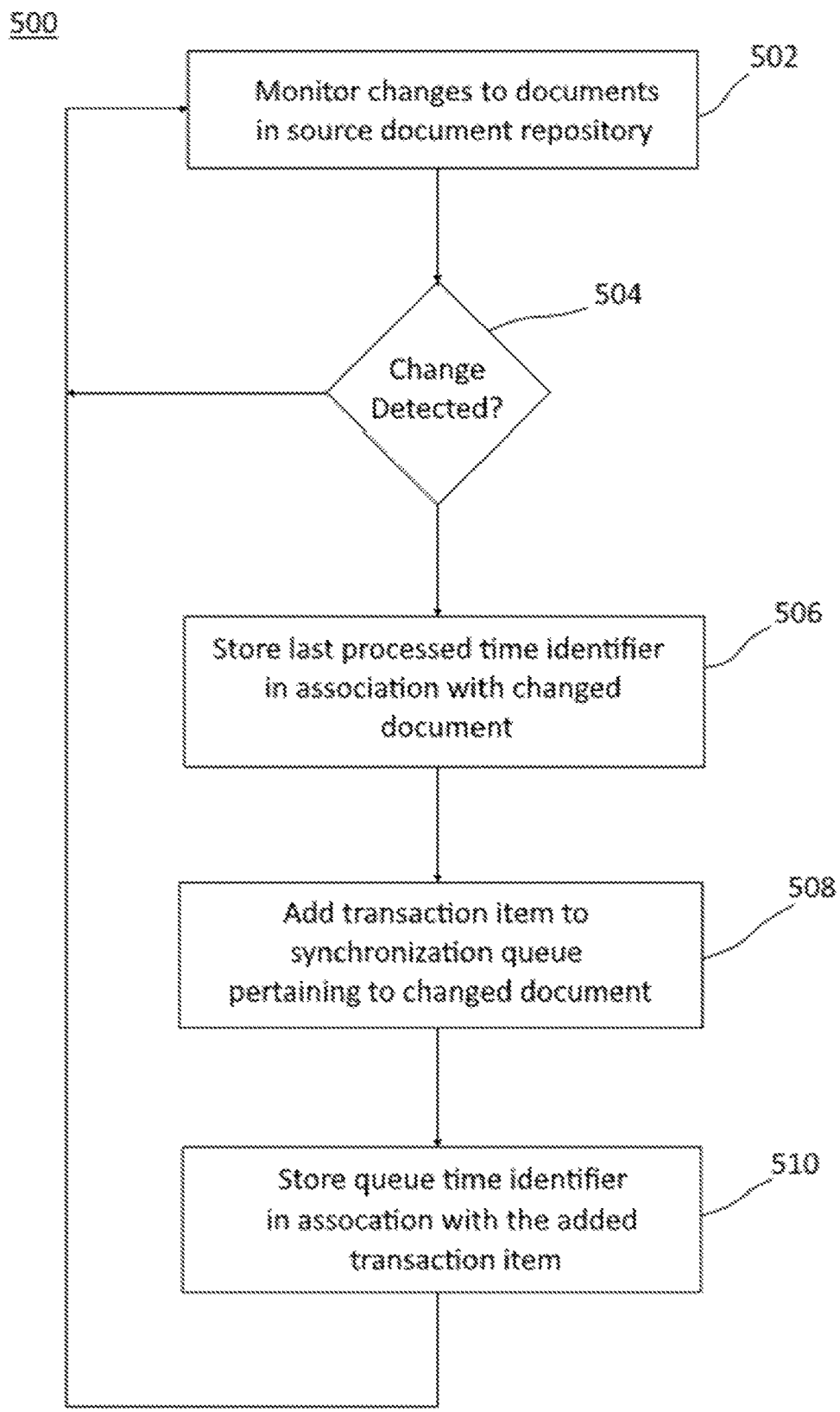
FIG. 5 shows an example method of adding transaction items to a synchronization queue that utilizes time-based identifiers in accordance with this disclosure.

An example of method 500 of adding transaction items to a synchronization queue, such as synchronization queue 214, is shown in FIG. 5. The method 500 begins with monitoring changes to the documents in a source document repository, such as source document repository 112 (block 502). When a change to a document is detected (block 504) and processed using the synchronization queue, the last processed time identifier for the modified document is stored in association with the changed document (block 506). For example, the last processed time identifier for the changed document may be stored in the metadata for the changed document. A transaction item corresponding to the changed document is added to the transaction queue (block 508). Additionally, a queue time identifier is stored in association with the added transaction item (block 510). For example, the queue time identifier may be stored in a field in the transaction item in the queue. The method then returns to block 502 to monitor for changes to documents in the document repository.

Figure 6:
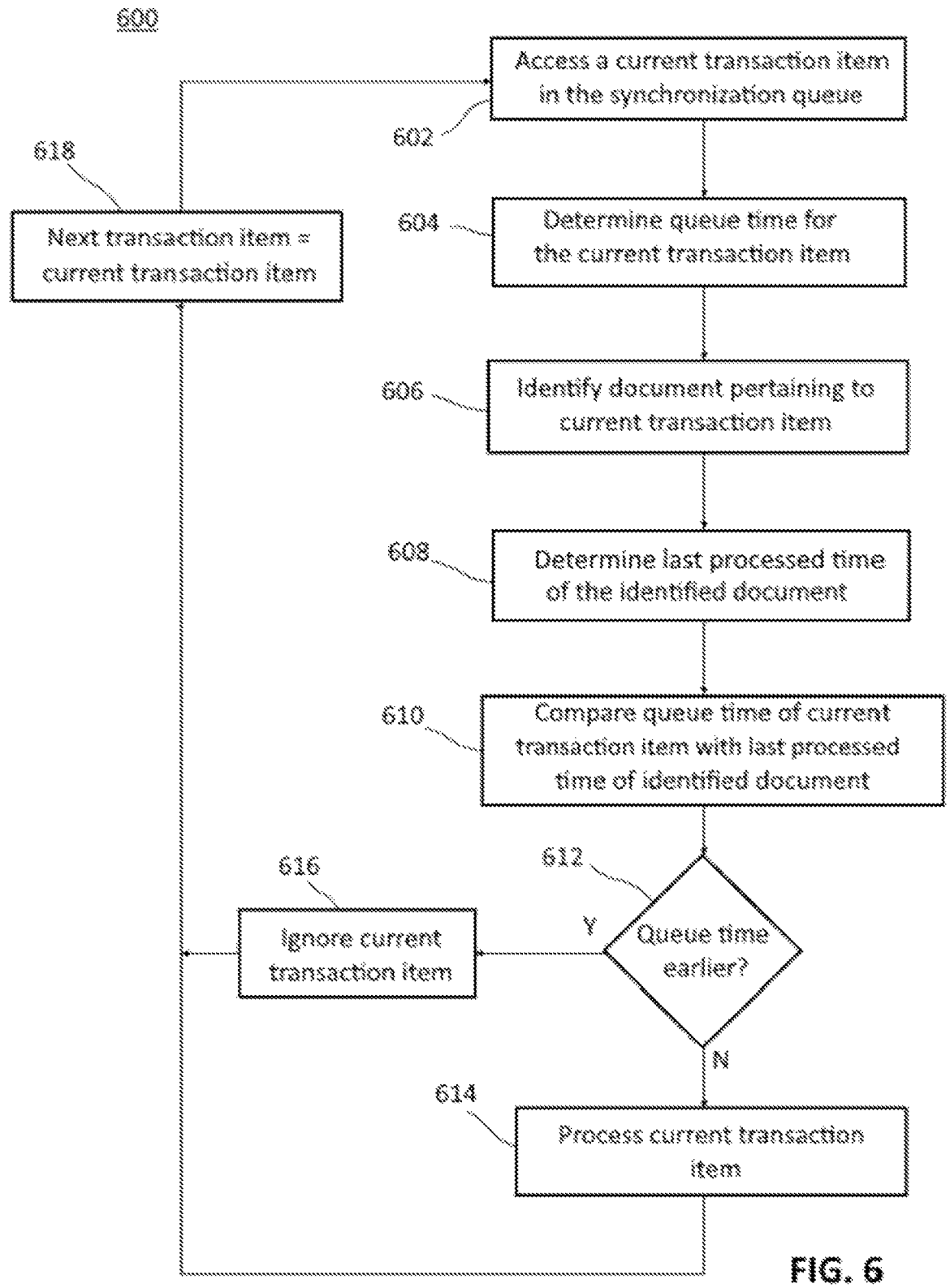
FIG. 6 shows an example method of processing transaction items in a synchronization queue that utilizes time-based identifiers in accordance with this disclosure.

The transaction processing component 218 processes the transaction items added to the synchronization queue. An example of a method 600 of processing transaction items in the synchronization queue based on time-based identifiers is shown in FIG. 6. The transaction processing component 218 is configured to access a current transaction item in the synchronization queue 214 (block 602) and to determine the queue time for the transaction item (block 604) and to identify the document pertaining to the current transaction item (block 606). The last processed time for the document is then determined (block 608). For example, the transaction processing component 218 may be configured to query the DMS 116 to retrieve the last processed time for the document from the metadata 204 by using the document identifier from the transaction item. Alternatively, the transaction processing component 218 may be configured to access the metadata directly to retrieve the last processed time pertaining to a document.

The transaction processing component 218 is then configured to compare the queue time identifier of the current transaction item to the last processed time of the document pertaining to the transaction item (block 610). If the queue time for the current transaction item is earlier than the last processed time of the document pertaining to the current transaction item (block 6102), the current transaction item may be ignored (block 616). If the queue time for the current transaction item is not earlier than the last processed time for the document pertaining to the current transaction item, the current transaction item is processed (block 614), e.g., by synchronizing the document to the target repository. The next transaction item in the synchronization queue is then designated the current transaction item (block 618) and the method returns to block 602 to access the current transaction item.

Using the example of FIGS. 3 and 4, transaction item 316 would be designated the current transaction item, and the transaction processing component would access transaction item 316 to determine the queue time (e.g., t1) and the document identifier (e.g., doc1) pertaining to the transaction item 316. The last processed time for document doc1 (e.g., t4) would then be determined from the metadata table 300. The transaction processing component 218 would determine that queue time t1 of transaction item 316 is earlier than the last processed time t4 of document doc1. As a result, transaction item 316 would be ignored which saves resources to perform other useful work as well as reducing synchronization latency of the system.

Processing transaction item 318 would result in a comparison of the queue time t2 of transaction item 318 with the last processed time t2 for the document doc2. Since the queue time t2 is not earlier than the last processed time t2 of the document doc2, transaction item 318 would be processed, e.g., by synchronizing document doc2 to the target document repository 114. The same goes for transaction item 320 and transaction item 322. Processing transaction items 318, 320, 322 would result in new information being synchronized to the target document repository.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 may be implemented in respective modules, which may also be referred to as, and/or include, logic, components, units, and/or mechanisms, Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
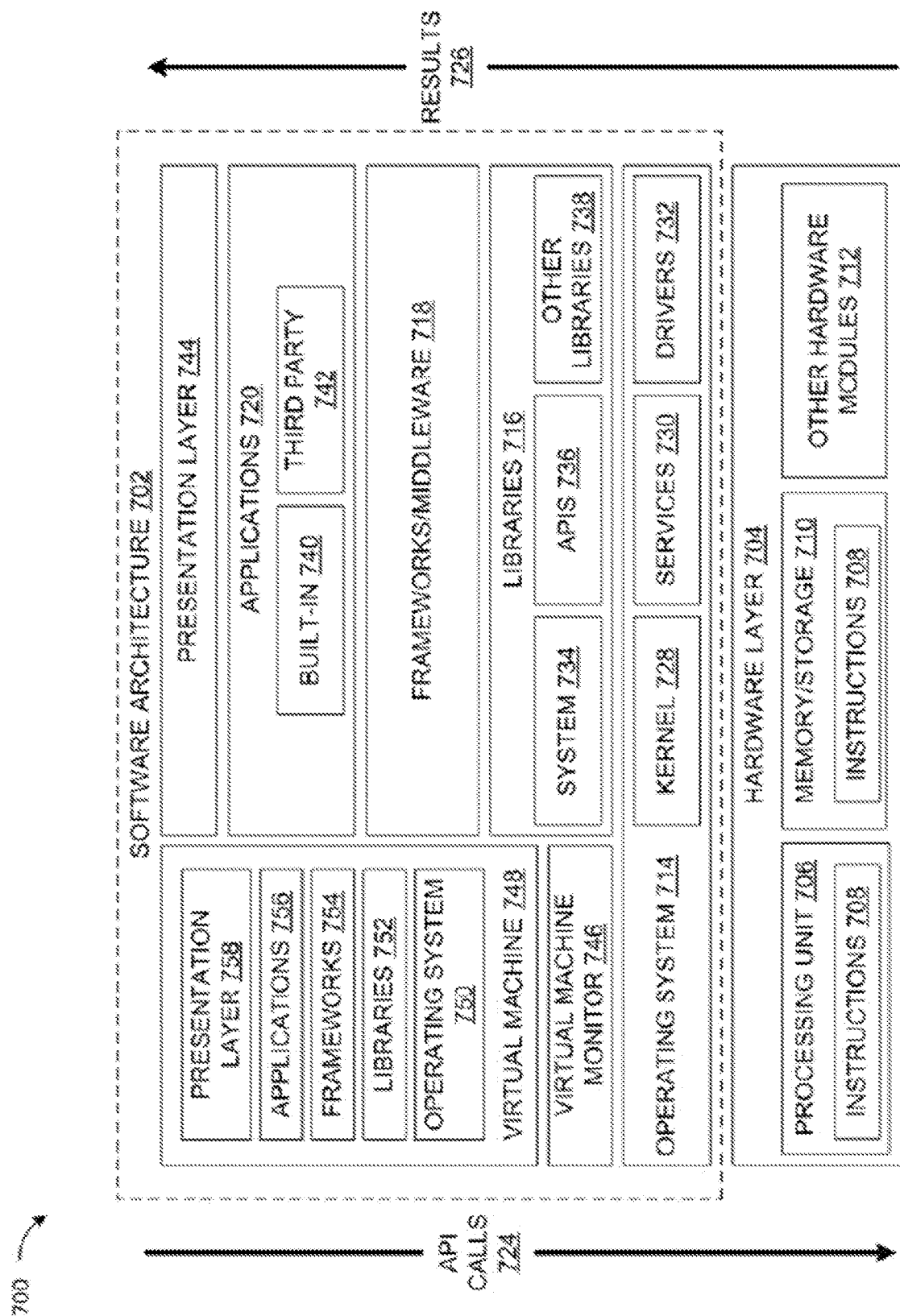
FIG. 7 is a block diagram illustrating an example software architecture, various portions of which may be used in conjunction with various hardware architectures herein described.

FI. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (i/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744, Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 1436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the framework 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
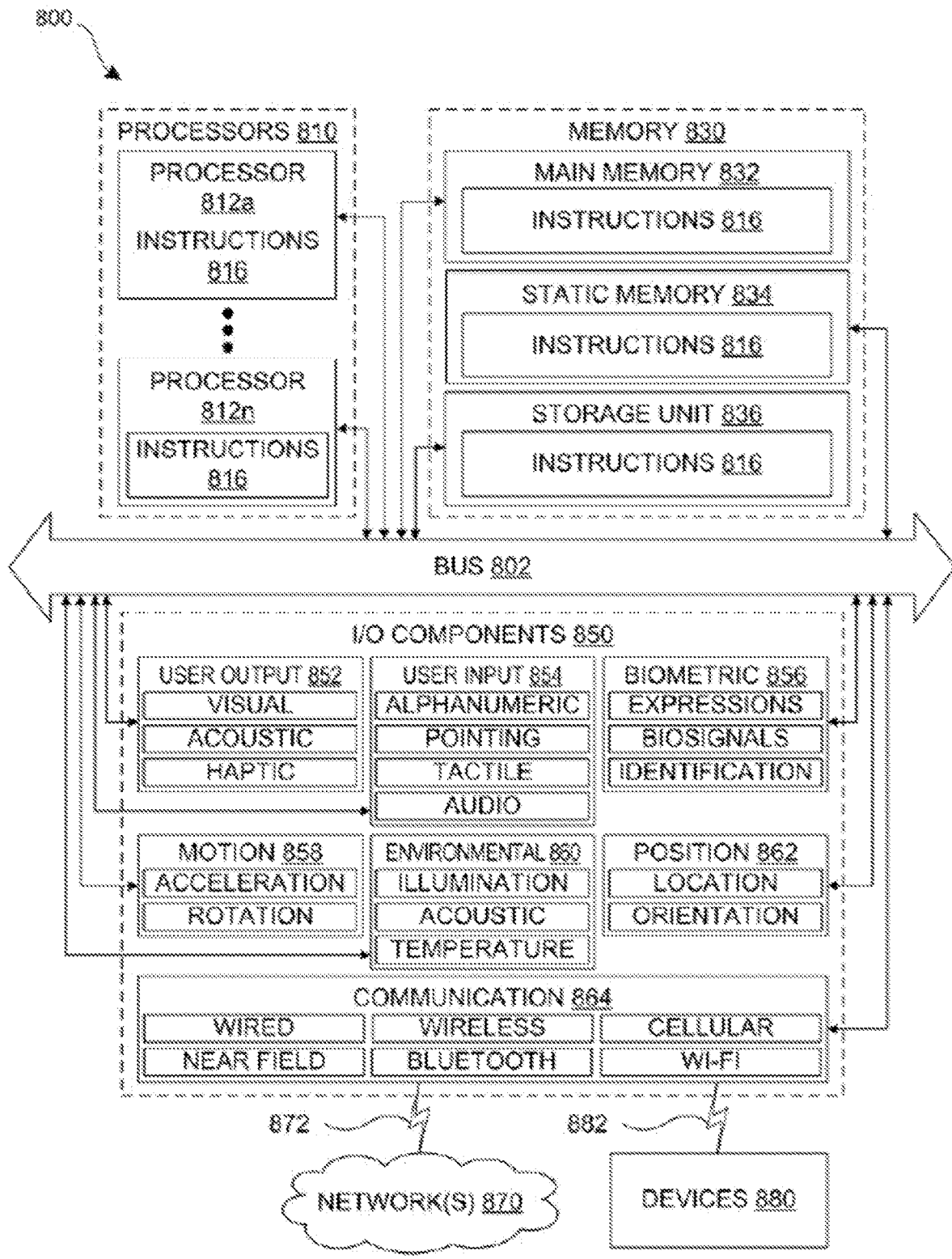
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in the form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaining and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other Memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof during execution thereof. Accordingly, the memory 332, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computing device comprising:
   at least one processor;
   a memory in communication with the processor, the memory comprising executable instructions that, when executed by the processor, cause the computing device to perform functions of:
   determining when documents in a source document repository have been changed;
   storing a last processed time in association with each of the changed documents that indicates a time when each of the respective changed documents was last processed;
   adding a transaction item to a synchronization queue for each of the changed documents, each transaction item identifying a document that was changed;
   storing a queue time in association with each transaction item that indicates a time when the transaction item was added to the synchronization queue;
   performing a transaction processing method on the transaction items in the synchronization queue, the transaction processing method including:
   accessing a current transaction item in the synchronization queue to determine a queue time of the current transaction item and to identify the document pertaining to the current transaction item;
   determining the last processed time of the document pertaining to the current transaction item;
   comparing the queue time of the current transaction item with the last processed time of the document pertaining to the current transaction item to determine whether the queue time is earlier than the last processed time;

if the queue time is not earlier than the last processed time, synchronizing the document pertaining to the current transaction item to a target document repository; and if the queue time is earlier than the last processed time, not synchronizing the document pertaining to the current transaction item to the target document repository.

2. The computing device of claim 1, wherein the functions further include:

updating the processed time of the documents each time the documents are processed to the target repository.

3. The computing device of claim 1, wherein the last processed time of each of the documents is stored in metadata for the documents.

4. The computing device of claim 3, wherein the metadata for the documents is stored in a metadata table.

5. The computing device of claim 4, wherein the metadata table is stored in a database, and wherein determining the last processed time of the document pertaining to the current transaction item includes querying the metadata table to retrieve the last processed time of the document using a structured query language (SQL).

6. The computing device of claim 4, wherein each of the transaction items in the synchronization queue includes a document identifier that identifies the document pertaining to each of the transaction items, wherein, when the current transaction item is being processed, the document identifier of the document pertaining to the current transaction item is used to locate a record for the document pertaining to the current transaction item in the metadata table and to identify the last processed time for the document pertaining to the current transaction item from the record.

7. The computing device of claim 1, further comprising:

performing the transaction processing method again with a next transaction item in the synchronization queue wherein the next transaction item is designated the current transaction item.

8. A method of synchronizing a source document repository with a target document repository, the method comprising:

determining when documents in a source document repository have been changed using a processor of a document management system;

storing a last processed time in association with each of the changed documents that indicates a time when each of the respective changed documents was last processed using the processor;

adding a transaction item to a synchronization queue for each of the changed documents, each transaction item identifying a document that was changed using the processor;

storing a queue time in association with each transaction item that indicates a time when the transaction item was added to the synchronization queue using the processor;

performing a transaction processing method on the transaction items in the synchronization queue using the processor, the transaction processing method including:

accessing a current transaction item in the synchronization queue to determine a queue time of the current transaction item and to identify the document pertaining to the current transaction item;

determining the last processed time of the document pertaining to the current transaction item;

comparing the queue time of the current transaction item with the last processed time of the document pertaining to the current transaction item to determine whether the queue time is earlier than the last processed time;

based on a result of the comparison, synchronizing the document pertaining to the current transaction item to the target document repository or not synchronizing the document pertaining to the current transaction item to the target repository.

9. The method of claim 8, further comprising:

updating the processed time of the documents each time the documents are processed.

10. The method of claim 8, wherein the last processed time of each of the documents is stored in metadata for the documents.

11. The method of claim 10, wherein the metadata for the documents is stored in a metadata table.

12. The method of claim 11, wherein the metadata table is stored in a database, and wherein determining the last processed time of the document pertaining to the current transaction item includes querying the metadata table to retrieve the last processed time of the document using a structured query language (SQL).

13. The method of claim 12, wherein each of the transaction items in the synchronization queue includes a document identifier that identifies the document pertaining to each of the transaction items, and where querying the metadata table to retrieve the last processed time includes querying the metadata table using the document identifier to retrieve the last processed time of the document pertaining to the current transaction item.

14. The method of claim 8, further comprising:

performing the transaction processing method again with a next transaction item in the synchronization queue wherein the next transaction item is designated the current transaction item.

15. A non-transitory computer-readable medium on which are stored instructions that, when executed, cause a programmable device to perform functions of:

determining when documents in a source document repository have been changed;

storing a last processed time in association with each of the changed documents that indicates a time when each of the respective changed documents was last processed;

adding a transaction item to a synchronization queue for each of the changed documents, each transaction item identifying a document that was changed;

storing a queue time in association with each transaction item that indicates a time when the transaction item was added to the synchronization queue;

performing a transaction processing method on the transaction items in the synchronization queue, the transaction processing method including:

accessing a current transaction item in the synchronization queue to determine a queue time of the current transaction item and to identify the document pertaining to the current transaction item;

determining the last processed time of the document pertaining to the current transaction item;

comparing the queue time of the current transaction item with the last processed time of the document pertaining to the current transaction item to determine whether the queue time is earlier than the last processed time;

if the queue time is earlier than the last processed time, ignoring the current transaction item; and if the queue time is not earlier than the last processed time, synchronizing the document pertaining to the current transaction item to a target document repository.

16. The non-transitory computer-readable medium of claim 15, wherein the functions further include:

updating the processed time of the documents each time the documents are processed using the synchronization queue.

17. The non-transitory computer-readable medium of claim 15, wherein the last processed time of each of the documents is stored in metadata for the documents.

18. The non-transitory computer-readable medium of claim 17, wherein the metadata for the documents is stored in a metadata table.

19. The non-transitory computer-readable medium of claim 18, wherein the metadata table is stored in a database, and wherein determining the last processed time of the document pertaining to the current transaction item includes querying the metadata table to retrieve the last processed time of the document using a structured query language (SQL).

20. The non-transitory computer-readable medium of claim 15, further comprising:

performing the transaction processing method again with a next transaction item in the synchronization queue wherein the next transaction item is designated the current transaction item.

* * * * *